(No Model.)
C. L. SCHALITZ.
VACUUM PAN.
No. 498,085. Patented May 23, 1893.
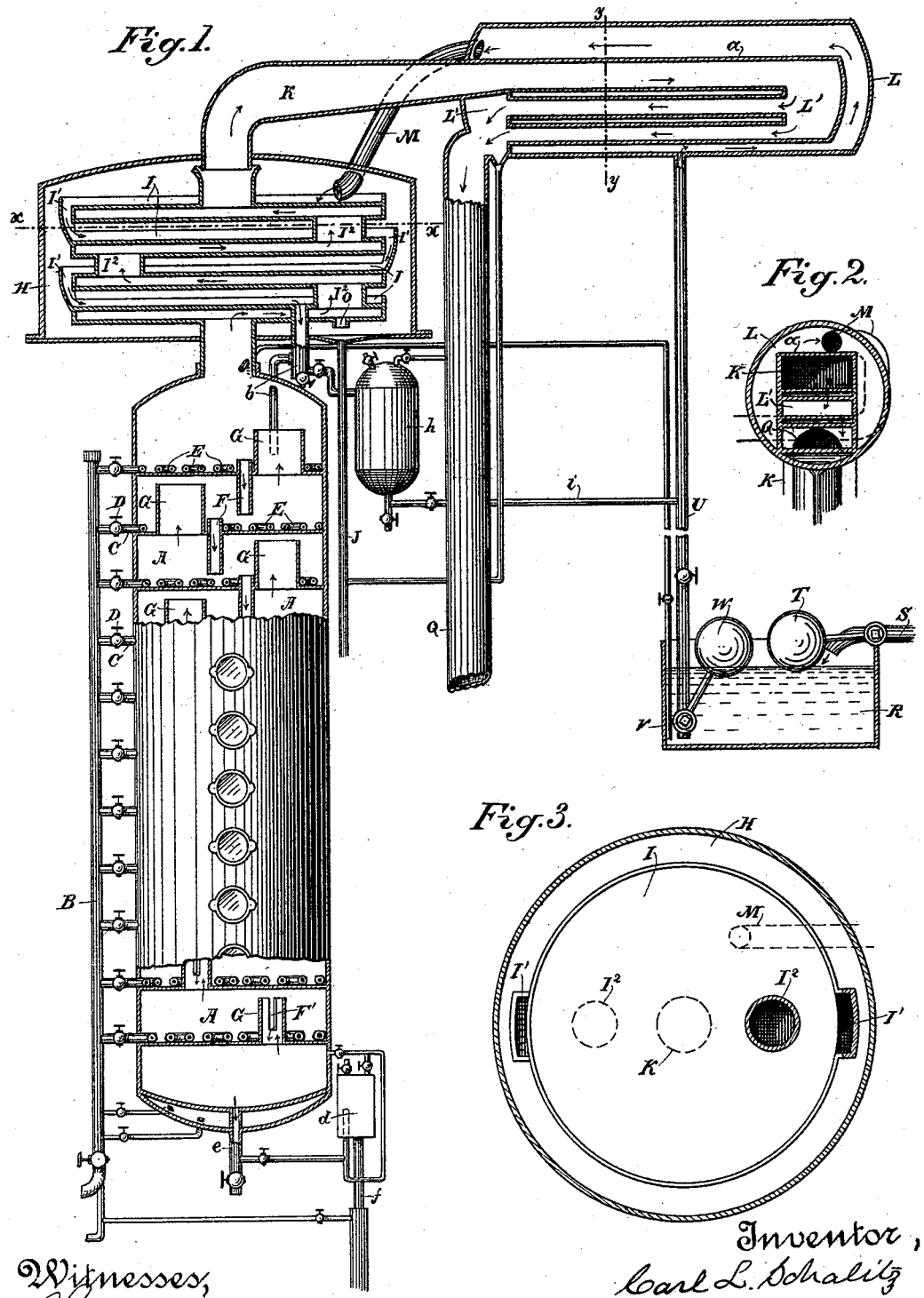
Witnesses,
Inventor,
Carl L. Schalitz
By Dewey & Co.
Attys

UNITED STATES PATENT OFFICE.

CARL L. SCHALITZ, OF SAN FRANCISCO, CALIFORNIA.

VACUUM-PAN.

SPECIFICATION forming part of Letters Patent No. 498,085, dated May 23, 1893.

Application filed February 2, 1893. Serial No. 460,777. (No model.)

*To all whom it may concern:*

Be it known that I, CARL L. SCHALITZ, a citizen of the United States, residing in the city and county of San Francisco, State of California, have invented an Improvement in Continuous Supply and Discharge Evaporating Apparatus; and I hereby declare the following to be a full, clear, and exact description of the same.

My invention relates to an apparatus for evaporating *in vacuo*, and for continuously supplying and discharging the material so that the apparatus can be run constantly instead of by separate charges, and to partly evaporate the material with vapor from the material which is being evaporated.

It consists in certain details of construction which will be more fully explained by reference to the accompanying drawings, in which—

Figure 1 is a vertical section through my apparatus. Fig. 2 is a vertical cross section through the heating chamber on line *y—y* of Fig. 1. Fig. 3 is a horizontal cross section through the supplemental chamber on line *x—x* of Fig. 1.

In carrying out my invention the apparatus may be made with one or more evaporating chambers. I find it practicable to make several chambers situated one above the other in form of a column, so that the evaporation may go on simultaneously in each of the chambers.

In Fig. 1, I have shown several chambers A placed one above the other in the form of a column.

B is a pipe bringing steam from the boiler or other source of supply, and C C are pipes with controlling cocks D through which steam is admitted into double bottoms or coils E upon the bottom of each of the chambers. Each of the chambers has an overflow pipe F through which the liquid is conveyed from the chamber above to the next adjacent chamber below. In some cases these pipes may be made so that instead of flowing over the top, the liquor will flow through slots in the sides of the pipe, and pass into the chamber below, as shown at F'.

G G are large open vapor pipes through which the vapor from the evaporation in each chamber is freely conveyed upward, and eventually delivered through the top of the column into a large supplemental chamber H, which is fixed above it. This chamber contains shallow pans situated one above the other as shown at I, and connected by chutes I'. These pans are so placed that the vapor arising from the chambers below passes over and through them, and as the liquid to be evaporated is constantly flowing over these pans in thin sheets, and is discharged from each to the next beneath, a considerable evaporation takes place in these pans, before the liquid passes to the chambers beneath. The vapor finally passes into the discharge pipe K which delivers it into the heater L through which the liquor passes around and over the vapor pipes or passages L' so that the vapor heats the liquor before it is delivered into the pans I. The liquor is delivered into these pans from the heater through the pipe M. Any moisture condensed from the steam which is passing up through the chamber H containing the pans I, is delivered through the pipe O into the pipe J which carries off the condensed water.

The vapor and air are drawn out of the apparatus through a pipe Q, which connects the vapor passages in the chamber L, with an air pump or vacuum producing apparatus not here shown.

R is a receiver or tank into which the liquid to be evaporated is first delivered through a pipe S, the supply to this receiver being controlled by a float T connected by a lever arm with a valve by which, when the receiver is sufficiently filled, the supply is cut off, and when the contents of the receiver are diminished, the valve will be again opened by the falling of the float.

U is a pipe leading from this receiver up into the heating chamber L, and through this the liquor is constantly drawn up into the chamber as long as the vacuum pump is at work, and is caused to flow over and around the vapor passages in this chamber before passing through the pipe M to the pans I. It is thus highly heated before reaching the pans.

V is a valve in the pipe U, and W is a float upon the end of a lever connected with this valve. This float opens the valve when the receiver is filled, and closes it when the receiver is empty, so that air would not rush into the pipe U and destroy the vacuum, in case the receiver should be accidentally emptied. The liquid passing upward through the pipe U and through the heating chamber L, rises to a point above the horizontal diaphragm $a$ in the heating chamber, beneath which the hot vapors are delivered. The liquid being thus heated is delivered through the pipe M into the pans I, and as each pan is covered to a sufficient depth, the liquid overflows through the chutes I' as shown, to the pans below, and is delivered from the lowermost pan through the pipe $b$ into the uppermost of the evaporating chambers A. The liquid overflows from one of these chambers to another until it reaches the bottom, where it is delivered out through a pipe $e$ and passes into the gravity tester $d$ from which it is again delivered through pipe $f$ to the discharge.

The vapor produced by the evaporation, and any air which may obtain entrance to the apparatus, or be originally contained therein, will be drawn off through the passages G, connecting the chambers with each other, and through the chamber H, and the main vapor pipe K into the heater chamber L as previously described. Thence it is drawn through the pipe Q connecting with the vacuum pump, and a vacuum is thus at all times maintained within the apparatus, while the liquid to be evaporated is continuously supplied from the receiver R through the connecting pipes and valve as previously described, and is also continuously discharged from the bottom of the lower chamber, so that the operation may continue as long as material is available, differing in this important respect from the ordinary vacuum evaporating apparatus in which the liquid to be evaporated is introduced in charges, and one charge must be removed before a new one can be introduced.

If, at any time, the apparatus is stopped, or it is desired to empty the pans I, or to prevent any more liquid from entering the evaporating chambers A, the liquid may be discharged by suitable cocks and pipes into the chamber $h$ so as to empty the pans I. When necessary this liquid can be drawn back into the receiver through the pipe $i$ which connects with the supply pipe U, and this liquid will thus be delivered again back into the heater and into the apparatus.

Having thus described my invention, what I claim as new, and desire to secure by Letters Patent, is—

1. A continuous supply and discharge vacuum evaporating apparatus consisting of a chamber or chambers, with supply and discharge pipes, passages through which vapor arising from the evaporation within the chambers is delivered, a heating bottom or coils through which an independent supply of steam is admitted to heat each chamber, a pipe adapted to connect the vapor discharge pipe with a vacuum producing mechanism, and a receiver into which fresh liquid is constantly supplied, with pipe leading from said receiver to the heating and evaporating chambers whereby a constant supply of liquid is provided, substantially as herein described.

2. An evaporating apparatus consisting of one or more chambers having overflow pipes whereby liquor is delivered successively from one chamber to the next adjacent by gravitation, a supply tank, pipes leading therefrom to a preliminary heater into which the liquid is forced by external air pressure, a pipe delivering from said heater into the uppermost of the evaporating chambers, overflow pipes from each chamber above to the next adjacent, and thence to the discharge, heating coils or bottoms placed in each of the evaporating chambers, and having an independently regulated steam supply, whereby the rate of evaporation in each chamber can be adjusted, vapor pipes connecting with the upper parts of said chambers, and thence through a general vapor discharge pipe into the preliminary heater, and a pipe adapted to connect said heater with a vacuum producing apparatus, substantially as herein described.

3. In a continuous evaporating apparatus, one or more evaporating chambers situated one above the other connected by overflow pipes whereby each chamber below is supplied from the one above, heating coils or bottoms in each of the chambers having independently regulated steam supply, a discharge pipe from the lowermost of the chambers, vapor pipes leading upwardly from each chamber below through the chambers above, an independent preliminary heater with which the uppermost of the evaporating chambers is connected, a pipe adapted to connect said heater with a vacuum producing apparatus whereby air and vapor are constantly drawn out of the evaporating chambers, a supply tank with automatic cocks whereby a constant supply of liquid is delivered into said reservoir, a pipe connecting said reservoir with the preliminary heating chamber whereby a constant supply of liquid is delivered into said chamber by reason of the vacuum produced therein, and a pipe leading from said preliminary heating chamber and delivering the heated liquid into the uppermost of the evaporating chambers, and a constant discharge from the lowermost evaporating chamber, substantially as herein described.

4. A continuous evaporating apparatus consisting of the series of superposed chambers having vapor communication between each and overflow pipes by which the liquid is delivered from each chamber to the next adjacent, independent heating coils or bottoms in each of the chambers with cocks to regulate the supply of steam thereto, a pipe through which a constant discharge of concentrated liquid may be delivered from the bottom chamber, a supply tank, a preliminary heater with which said tank is connected by a pipe, and a pipe delivering from said heater to the uppermost of the evaporating chambers, a vapor discharge pipe connecting the uppermost of the evaporating chambers with the heater and through it with a pipe adapted for connection with a vacuum producing apparatus, pipes for the discharge of condensed water from the uppermost evaporating chambers, and a receiver into which the liquid within said chambers may be discharged when the apparatus is stopped, substantially as herein described.

5. A continuous evaporating apparatus consisting of a series of contiguous independently heated chambers with a series of overflow discharge passages between, a discharge from the final chamber and outlets for the vapor, a preliminary heater into which the liquid to be evaporated is continuously delivered, a series of intermediate evaporating pans through which the liquid flows from the heater to the chambers, passages through which the vapor passes from the chambers and pans to the heater and thence to a pipe adapted for connection with vacuum producing apparatus, substantially as herein described.

In witness whereof I have hereunto set my hand.

CARL L. SCHALITZ.

Witnesses:
S. H. NOURSE,
H. F. ASCHECK.